United States Patent [19]

Ito et al.

[11] 3,810,611

[45] May 14, 1974

[54] HYDROPNEUMATIC SUSPENSION UNIT FOR A ROAD VEHICLE

[75] Inventors: Naganori Ito; Hiroshi Aikawa, both of Tokyo, Japan

[73] Assignee: Nissan Motor Comapny, Limited, Yokohama City, Japan

[22] Filed: Feb. 7, 1973

[21] Appl. No.: 330,323

[30] Foreign Application Priority Data
Feb. 8, 1972  Japan............................... 47-13258
Feb. 8, 1972  Japan............................... 47-13259

[52] U.S. Cl. ........................ 267/64 R, 267/DIG. 1
[51] Int. Cl................................................ F16f 5/00
[58] Field of Search......... 267/64 R, DIG. 1, DIG. 2

[56] References Cited
UNITED STATES PATENTS
3,409,286  11/1968  Erdmann .............................. 267/64
3,493,239  2/1970  Allinquant............................ 267/64

*Primary Examiner*—James B. Marbert

[57] ABSTRACT

A hydropneumatic suspension unit adapted to be mounted between a wheel supporting means and a body of a road vehicle for maintaining the vehicle body level substantially constant irrespective of weight and load of the vehicle. The hydropneumatic suspension unit includes besides a hydropneumatic spring unit, a cylinder body having a cylinder head and a cylinder chamber filled with hydraulic fluid under pressure, and a main piston slidably received in the cylinder chamber. The cylinder head is formed with a hydraulic fluid inlet and an outlet, which communicate with the cylinder chamber through inlet and outlet passages, respectively. The hydropneumatic suspension unit also includes inlet and outlet valves provided in the inlet and outlet passages, respectively. The inlet passage is formed of an inner wall of an axial bore formed in the cylinder head and an outer periphery of a first floating piston slidably received in the axial bore of the cylinder head, whereas the outlet passage is formed of a radial bore formed in the first floating piston and bores formed in a second floating piston slidably received in an axial bore formed in the first floating piston.

26 Claims, 10 Drawing Figures

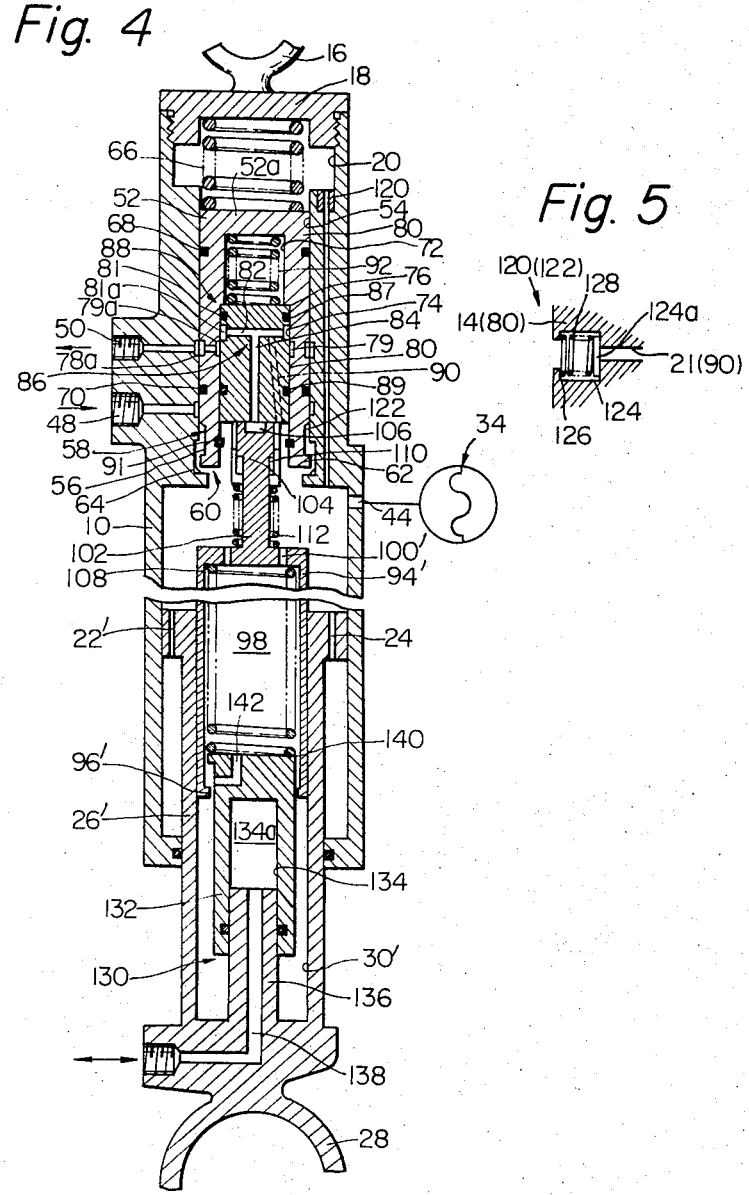

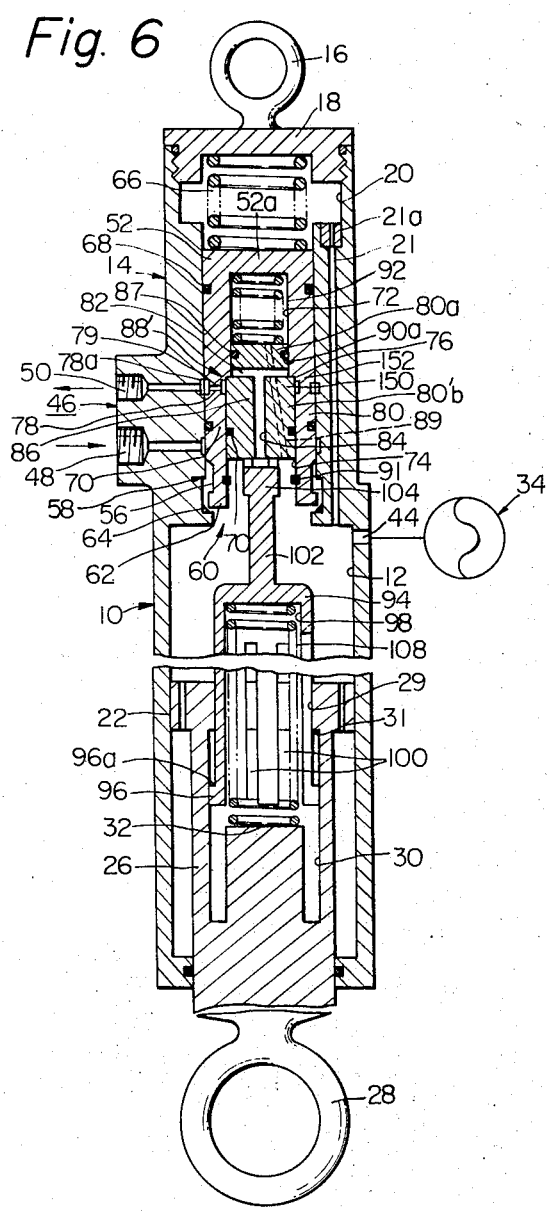

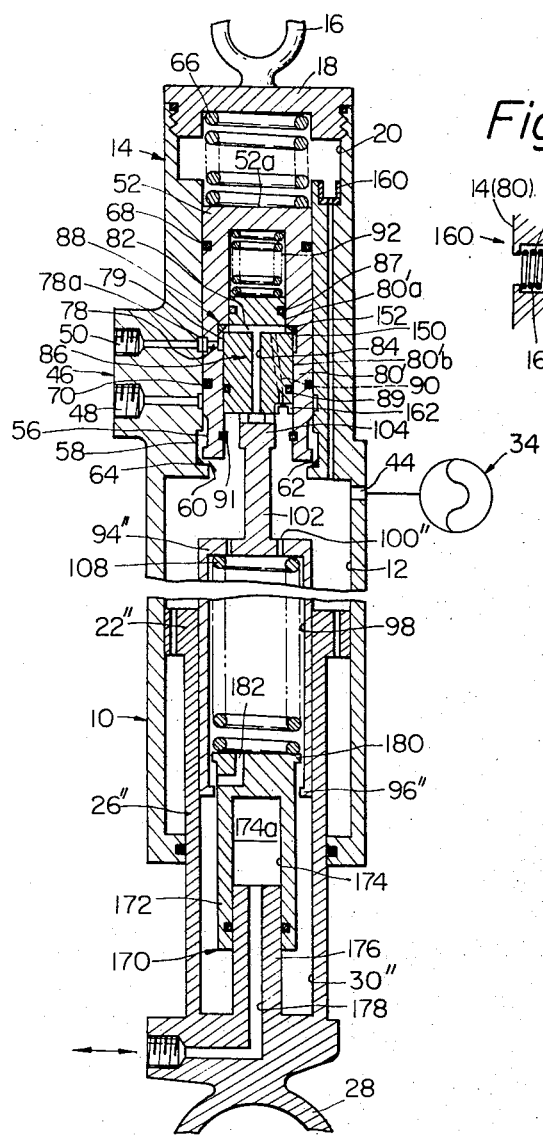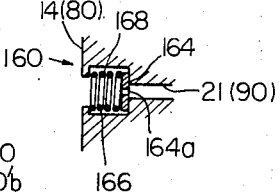
Fig. 9
Fig. 10

HYDROPNEUMATIC SUSPENSION UNIT FOR A ROAD VEHICLE

This invention relates in general to suspension units for a road vehicle and, more particularly, to a hydropneumatic suspension unit adapted for automatically adjusting the level of the vehicle body in relation to ground independently of the weight and load of the vehicle.

A hydropneumatic suspension unit employed in a known road vehicle usually includes a cylinder body having a cylinder chamber filled with hydraulic fluid under pressure, a cylinder head formed with a fluid inlet and an outlet, and a main piston slidably accommodated in the cylinder chamber. The cylinder body is mounted on a vehicle body whereas the main piston is mounted on a wheel supporting means such as an axle. These parts are so arranged as to maintain the effective length of the hydropneumatic suspension unit substantially constant irrespective of the weight and load of the vehicle. This is attained by controlling fluid communications between the cylinder chamber and either one of the fluid inlet and outlet. To this end, the hydropneumatic suspension unit is usually equipped with a vehicle body level adjusting device including a valve spool which is normally held in its neutral or equilibrium condition by means of a set of two springs and which is movable to different positions to selectively open and close the fluid inlet and outlet. With this construction, the valve spool is liable to vibrate due to irregularities of the road surface since the main piston is responsive thereto. In order to avoid vibrations of the valve spool in response to the irregularities of the road surface, it has heretofore been proposed to provide in the valve spool a restricted flow passage or orifice through which hydraulic fluid is passed into or out of the cylinder chamber.

A conventional hydropneumatic suspension unit thus constructed is advantageous in that the whole unit is simple in construction. However, since the valve spool is slidably received in a piston chamber formed in the cylinder head, leakage of hydraulic fluid takes place between the inner peripheral wall of the piston chamber and the outer circumferential wall of the valve spool. Accordingly, if the hydropneumatic suspension unit is not used for a relatively long period of time, then the effective length of the whole unit is inevitably reduced due to leakage of hydraulic fluid into the outlet and, therefore, the vehicle body level is gradually decreased.

To solve this problem, it has heretobefore been proposed to provide sealing means between the piston chamber and the valve spool slidably accommodated therein with a view to minimizing leakage of hydraulic fluid into the fluid outlet. A drawback is still encountered with this prior art practice in that since hydraulic fluid in the cylinder chamber escapes into the hydraulic fluid reservoir, the pressure in the accumulator of the source of hydraulic fluid under pressure should be increased before starting of the vehicle.

In order to overcome the shortcomings encountered in the conventional hydropneumatic suspension units, an attempt has been made to employ a set of poppet valves adapted to open and close the fluid inlet and outlet, respectively. The poppet valves have an advantage in that the leakage of hydraulic fluid into the fluid outlet can be satisfactorily eliminated. However, with the provision of the poppet valves, the hydropneumatic suspension unit becomes complicated in construction. Moreover, the poppet valves are unreliable in operation and, therefore, it is quite difficult to maintain the level of the vehicle body substantially constant.

It is, therefore, an object of the present invention to provide an improved hydropneumatic suspension unit for use in a road vehicle which is adapted to overcome the above-mentioned shortcomings encountered in the prior art devices.

Another object of the present invention is to provide a hydropneumatic suspension unit for a road vehicle which is simple in construction and reliable in operation.

Another object of the present invention is to provide a hydropneumatic suspension unit for a road vehicle which is so constructed as to minimize the liakage of hydraulic fluid into the fluid outlet of the vehicle body level adjusting device incorporated in the hydropneumatic suspension unit whereby the level of the vehicle body is maintained at a substantially constant level at all times even when the vehicle and its hydropneumatic suspension units are not in use for a relatively long period of time.

Still another object of the present invention is to provide a hydropneumatic suspension unit for a road vehicle which is adapted to operate without significant fluid consumption taking place due to irregularities of the road surface on which the vehicle travels.

A further object of the present invention is to provide a hydropneumatic suspension unit for a road vehicle and having a novel vehicle body level adjusting device by which the vehicle body level is quickly adjusted independently of the weight and load of the vehicle.

A further object of the present invention is to provide a hydropneumatic suspension unit for a road vehicle and having a novel vehicle body level adjusting device which operates highly reliably without excessive fluid consumption taking place.

A yet further object of the present invention is to provide a hydropneumatic suspension unit having a novel vehicle body level adjusting device which is simple in construction and easy to manufacture.

In order to achieve these objects, there is provided a hydropneumatic suspension uni adapted to maintain the vehicle body level substantially constant irrespective of the weight and load of the vehicle. The hydropneumatic suspension unit has a cylinder body with a cylinder head, a cylinder chamber formed in the cylinder body, and a main piston slidably received in the cylinder chamber. In a first preferred embodiment, the hydropneumatic suspension unit includes a vehicle body level adjusting device having a hydraulic fluid inlet and an outlet formed in the cylinder head spacedly from each other in an axial direction. The hydraulic fluid inlet communicates with the cylinder chamber through an inlet passage, which is formed by an inner wall of an axial bore formed in the cylinder head and an annular recess formed on the outer periphery of a first floating piston slidably received in the axial bore of the cylinder head. The hydraulic fluid outlet communicates with the cylinder chamber through an outlet passage formed by a radial bore formed in the first floating piston, and a radial passage and an axial passage formed in a second floating piston slidably received in an axial passage formed in the first floating piston.

An inlet valve is formed in the inlet passage and an outlet valve is formed in the outlet passage. The inlet and outlet valves are both arranged to be closed when the first and second floating pistons are kept in the neutral position so that an effective length of the hydropneumatic suspension unit is maintained at a predetermined level. If the length is less than the predetermined one, the inlet valve is opened whereas the outlet valve is closed by moving the first and second floating pistons to a first vehicle level adjusting position. In this condition, hydraulic fluid in the hydraulic fluid inlet is admitted through the inlet passage to the cylinder chamber to increase the volume of hydraulic fluid therein so that the effective length of the hydropneumatic suspension unit returns to its predetermined level. If the length is over the predetermined one, the outlet valve is opened whereas the inlet valve is closed by moving the first and second floating pistons to a second vehicle level adjusting position. In this condition, hydraulic fluid in the cylinder chamber is admitted through the outlet passage to the hydraulic fluid outlet through which excessive hydraulic fluid is drained off so that the volume of hydraulic fluid in the cylinder chamber is reduced until the effective length of the hydropneumatic suspension unit reaches the predetermined level.

The inlet valve may be formed of a valve seat formed in the cylinder head at a lower end portion of the axial passage formed therein, and a lower circumferential edge of the first floating piston. The outlet valve may be formed of a circumferential edge of an annular recess formed in the first floating piston adjacent the radial passage thereof, and a circumferential edge of an annular recess formed on the outer periphery of the second floating piston adjacent the radial passage thereof. Alternatively, the outlet valve may be formed of a valve seat formed on the first floating piston and a circumferential edge formed on the second floating piston.

The hydropneumatic suspension unit may further include a sealing member which is mounted on a push rod to selectively close the outlet passage when the push rod engages the lower surface of the second floating piston, viz., when the first and second floating pistons are moved to the neutral position and to the first vehicle level adjusting position.

In another preferred embodiment, the hydropneumatic suspension unit further includes first and second one-way check valves provided in first and second fluid passages formed in the cylinder head and the second floating piston, respectively, which passages provide fluid communication between the cylinder chamber and a fluid chamber defined between an inside end wall of the cylinder head and an upper surface of the first floating piston and fluid communication between the cylinder chamber and a fluid chamber defined between the inside end wall of the first floating piston and an upper surface of the second floating piston, respectively. The first and second one-way check valves are arranged to provide a flow restricting action only when the first and second floating pistons are respectively moved in a direction to close the inlet and outlet valves, viz., toward the neutral position.

The hydropneumatic suspension unit may also include a vehicle level control or selector device adapted to selectively change the effective length of the hydropneumatic suspension unit.

These and other objects and advantages of the present invention will become more apparent from the following description when taken in conjunction with the accompanying drawings, in which:

FIG. 4 is a longitudinal sectional view of another preferred embodiment of the hydropneumatic suspension unit according to the present invention;

FIG. 5 is an enlarged fragmentary sectional view illustrating a part of the hydropneumatic suspension unit shown in FIG. 4;

FIG. 6 is a longitudinal sectional view of still another preferred embodiment of the hydropneumatic suspension unit according to the present invention;

FIG. 9 is a longitudinal sectional view of still another embodiment of the hydropneumatic suspension unit shown in FIG. 6; and FIG. 10 is an enlarged fragmentary cross sectional view illustrating a part of the hydropneumatic suspension unit shown in FIG. 9.

Figure 1:
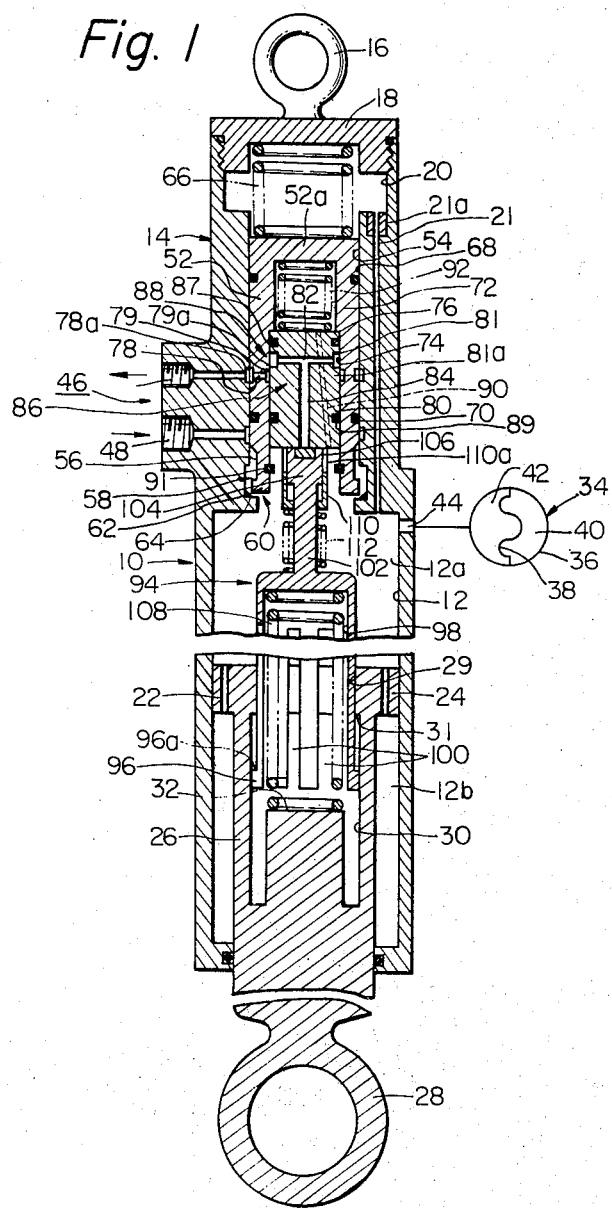
FIG. 1 is a longitudinal sectional view of a preferred embodiment the hydropneumatic suspension unit according to the present invention.

Referring now to FIG. 1, there is shown in section a preferred embodiment of the hydropneumatic suspension unit according to the present invention. As shown, the hydropneumatic suspension unit comprises a cylinder body 10 having a cylinder chamber 12 which is axially formed therein and which is filled with hydraulic fluid under pressure as will be described in detail hereinafter. The cylinder body 10 has at its upper portion a cylinder head 14 which is mounted on a vehicle underbody structure (not shown) through a mounting eye 16 formed at the uppermost end of the cylinder head 14 or an end plug 18 screwed into an axial bore 20 formed in the upper portion of the cylinder head 14. Indicated at 21 is an elongate fluid passage which is formed in the cylinder head 14 so as to provide fluid communication between a fluid chamber defined by an inside end wall of the cylinder head 14 and an upper surface of the first floating piston 52 and the cylinder chamber 12. A flow restriction 21a is provided in the fluid passage 21 to restrict the flow of fluid passing therethrough. A main piston 22 is axially slidably accommodated in the cylinder chamber 12 and divides the cylinder chamber 12 into upper and lower compartments 12a and 12b. The piston 22 has formed therein an axially extending restricted flow passage or passages 24 to provide restricted fluid communication between the upper and lower compartments 12a and 12b thereby to effect smooth movements of the main piston 22 within the cylinder chamber 12. The main piston 22 has a piston rod 26 extending outwardly of the cylinder chamber 12. The piston rod is formed at its lowermost end with a mounting eye 28, through which the piston rod 26 is connected to a wheel supporting means of the vehicle such as an axle (not shown). As seen in FIG. 1, the main piston 22 and the piston rod 26 extending therefrom are formed with stepped axially extending bores 29 and 30, between which an annular shoulder 31 is formed. Indicated at 32 is an axial projection formed within the piston rod 26 and serving as a spring seat as will be apparent from the subsequent description. With the construction described hereinabove, the cylinder chamber 12 is filled with hydraulic fluid under pressure, as already mentioned hereinabove, which is maintained at a substantially constant level so as to keep the effective length of the hydropneumatic suspension unit at a substantially constant value in a manner as will be subsequently discussed in detail.

In FIG. 1, the hydropneumatic suspension unit according to the present invention is shown as further comprising a hydropneumatic spring device which is provided for the purpose of dampening changes in the pressure level of the hydraulic fluid in the cylinder chamber 12 due to relative motions of the cylinder body 10 and the main piston 22 caused by irregularities on the road surface on which the vehicle travels. The hydropneumatic spring device, which is generally designated by reference numeral 34, includes a casing 36 which is internally divided by a flexible partition member 38 into separate chambers 40 and 42. The chamber 40 is totally closed by the flexible partition member 38 and is filled with a compressible gas such as nitrogen under pressure. The other chamber 42 communicates through a passage 44 with the cylinder chamber 12. The chamber 42 is thus filled with hydraulic fluid under pressure from the cylinder chamber 12. It should be noted that the arrangement constituted by the cylinder body 10, main piston 22 and the hydropneumatic spring device 34 serves as a shock absorber.

As shown in FIG. 1, the hydropneumatic suspension unit according to the present invention also comprises a vehicle level adjusting device which is adapted to control the flow of hydraulic fluid into or out of the cylinder chamber 12 whereby the hydraulic fluid pressure in the cylinder chamber 12 is maintained at a substantially constant level as previously mentioned. The vehicle level adjusting device, generally indicated at 46, includes a hydraulic fluid inlet 48 and a hydraulic fluid outlet 50 which are formed in the cylinder head 14. The hydraulic fluid inlet is located in an axial direction below the hydraulic fluid outlet 50 and is hydraulically connected to a source (not shown) of hydraulic fluid under pressure to receive hydraulic fluid under pressure therefrom. The hydraulic fluid outlet 50, which is located in the axial direction above the hydraulic fluid inlet 48, serves as a drain for draining off excessive hydraulic fluid from the cylinder chamber 12.

A first floating piston 52 is slidably disposed in an axial bore 54 formed in the cylinder head 14, the axial bore 54 being a continuation of the axial bore 20 formed in the upper portion of the cylinder head 14 and closed by the end plug 18. The first floating piston 52 is formed at its lower end portion with a circumferential annular recess 56 to form an inlet passage 58 with the peripheral wall of the axial bore 54. The inlet passage 58 provides fluid communication between the hydraulic fluid inlet 48 and the cylinder chamber 12.

An inlet valve 60 is provided in the inlet passage 58 formed between the circumferential annular recess of the first floating piston 52 and the peripheral wall of the axial bore 54 to open and close the inlet passage 58. The inlet valve 60 is formed of a lowermost circumferential edge 62 of the first floating piston 52 and a valve seat 64 formed in the cylinder head 14, namely, the lower portion of the axial bore 54. It should be noted that the inlet valve 60 is formed in the inlet passage 58 at a position to be closed when the first floating piston 52 assumes a neutral position as shown in FIG. 1. Thus, the inlet valve 60 opens the inlet passage 58 and increases the flow rate of hydraulic fluid passing through the inlet passage 58 as the first floating piston 52 moves upwardly as viewed in FIG. 1, namely, toward a first vehicle level adjusting position. In the same manner, the inlet valve 60 decreases the flow rate of hydraulic fluid passing through the inlet passage 58 as the first floating piston 52 moves downwardly as viewed in FIG. 1, namely, toward a neutral position and finally closes the inlet passage 58 when the first floating piston 52 reaches the neutral position.

A compression spring 66 is mounted in the axial bore 20 of the cylinder head 14 between the end plug 18 and the upper surface of the first floating piston 52 to bias the first floating piston 52 toward the neutral position. Thus, the inlet valve 60 is maintained in its closed condition by the action of the compression spring 66. Sealing rings 68 and 70 are located in annular recesses (not identified) formed above and below a radial passage 78 of the first floating piston to provide sealing functions between the wall of the axial bore 54 and the outer periphery of the first floating piston 52.

As seen in FIG. 1, the first floating piston 52 has formed therein axially aligned stepped bores 72 and 74, between which a radially extending annular shoulder 76 is formed. The bore 72 is closed at its upper end by an end wall 52a. The radially extending passage 78 forms a part of an outlet passage to be subsequently described. An annular recess 79 is formed in the wall of the axial bore 74 of the first floating piston 52 and has a circumferential edge 79a, which will be described in detail hereinafter. Another annular recess 78a is formed in the bore 54 and communicates with the outlet 50.

As shown, a second floating piston 80 is slidably accommodated in the axial bore 74 of the first floating piston 52 and adapted to abut against the annular shoulder 76 when it is moved to its upper extreme position. The second floating piston 80 is formed at the outer circumferential periphery thereof with an annular recess 81, which has a circumferential edge 81a.

A radially extending passage 82 is formed in the second floating piston 80 so as to communicate with the annular recess 81 formed thereon. An axially extending passage 84 is also formed in the second floating piston 80, which communicates at its one end with the radially extending passage 82 formed in the second floating piston 80 and at its other end with the cylinder chamber 12. An outlet passage 86 is thus formed between the hydraulic fluid outlet 50 and the cylinder chamber 12 of the cylinder body 10 by the radial passage 78 formed in the first floating piston 52, the radial passage 82 and the axial passage 84 formed in the second floating piston 80.

To open and close the outlet passage 86, an outlet valve 88 is provided in the outlet passage 86. The outlet valve 88 is formed of the circumferential edge 79a of the annular recess 79 formed in the inner wall of the axial bore 74 of the first floating piston 52 and the circumferential edge 81a of the annular recess 81 formed on the outer periphery of the second floating piston 80. It should be noted that the outlet valve 88 is formed in the outlet passage 86 in a position to be closed when the second floating piston 80 and the first floating piston 52 assume the neutral position as shown in FIG. 1.

Thus, the outlet valve 88 is closed when the first and second floating pistons 52 and 80 are moved to the first vehicle level adjusting position, whereas, when the second floating piston 80 is moved to the second vehicle level adjusting position, the outlet valve 88 is opened to allow excess hydraulic fluid in the cylinder chamber 12 to flow into the hydraulic fluid outlet 50.

Indicated at 90 is a fluid passage which is formed in the second floating piston 80 so as to provide a restricted fluid communication between a fluid chamber defined by the inside end wall of the first floating piston 52 and the upper surface of the second floating piston 80 and the cylinder chamber 12 of the cylinder body 10 to dampen oscillations of the second floating piston 80 within the axial bore 74.

A limit ring 91 is located on the wall of the axial bore 74 at the lower end portion thereof to prevent excessive downward movement of the second floating piston 80.

Sealing rings 87 and 89 are provided on the outer periphery of the second floating piston 80 above and below the annular recess 81 to provide sealing functions between the wall of the axial bore 74 of the first floating piston 52 and the outer periphery of the second floating piston 80.

A compression spring 92 is disposed in the axial bore 72 formed in the first floating piston 52 and engages at its one end the end wall of the axial bore 72 and at its other end the upper surface of the second floating piston 80 for biasing the second floating piston 80 in a direction to open the outlet valve 88 or toward the second vehicle level adjusting position. This compression spring 92 will be referred to as the vehicle level adjusting spring hereinafter.

To control the movements of the first and second floating pistons 52 and 80, a push rod 94 is provided in the cylinder chamber 12 and serves in coaction with a compression spring as a biasing means to bias the first and second floating pistons 52 and 80 in the direction of the first vehicle level adjusting position. The push rod 94 is slidably received in the axial bore 29 formed in the main piston 22. The push rod 94 is formed at its lowermost end with an annular projection 96. The annular projection 96 is slidably disposed in the axial bore 30 formed in the piston rod 26 extending from the main piston 22 and has an annular shoulder 96a which engages the annular shoulder 31 formed in the main piston 22, when the push rod 94 is moved to its uppermost position, to prevnet excessive upward movement of the push rod 94. The push rod 94 has formed therein a cavity 98 and an elongate slot or slots 100 to provide fluid communications between the cavity 98 and the cylinder chamber 12 or the axial bore 30 of the piston rod 26. The push rod 94 has an axial extension 102 provided at its uppermost end with a head portion 104. The head portion 104 of the axial extension 102 is intended to engage the lower surface of the second floating piston 80 to move the second floating piston 80 and accordingly the first floating piston upwardly of the drawing, viz., toward the first vehicle level adjusting position. The head portion 104 of the axial extension 102 has mounted thereon a sealing member 106, which closes tightly the axial passage 84 serving as a port for the outlet passage 86.

To bias the push rod 94 toward the first vehicle, level adjusting position a compression spring 108 is mounted between the push rod 94 and the piston rod 26, viz., in the cavity 98 of the push rod 94. This compression spring 108 cooperates with the push rod 94 as the biasing means and engages at its one end the end wall of the cavity 98 and at its other end a spring seat 32 formed in the piston rod 26. The compression spring 108 will be referred to as the vehicle level detecting spring hereinafter.

As shown in FIG. 1, a sleeve 110 is slidably mounted on the head portion 104 of the axial extension 102 of the push rod 94 and has a plurality of axially extending slots 110a formed in the wall of the sleeve 110 to freely pass hydraulic fluid therethrough. The sleeve 110 is biased upwardly as viewed in FIG. 1 by a compression spring 112 having a weak spring force so that the sleeve 110 engages the lower surface of the second floating piston 80 before the head portion 104 of the axial extension 102 engages therewith. Thus, the sleeve 110 and the compression spring 112 serve as a shock absorber.

Normally, the effective length of the hydropneumatic suspension unit is maintained at a substantially constant value irrespective of the weight and load of the vehicle body. In this condition, the first and second floating pistons 52 and 80 of the vehicle level adjusting device 46 are kept in the neutral position, as shown in FIG. 1 in which the sum of spring forces of the compression springs 66 and 92 balances with the opposing force of the compression spring 108. Under this circumstance, the inlet and outlet valves 60 and 88 are closed so that hydraulic fluid is prevented from being supplied into or out of the cylinder element 12. Thus, the body of the vehicle is maintained at a predetermined level relative to ground and at which level the pressure and volume of hydraulic fluid in the cylinder chamber 12 are sufficient to support the weight and load of the vehicle.

When the vehicle is in motion and its load and weight are constant, irregularites in the road surfaces over which the vehicle is travelling cause relative movements between the vehicle underbody structure and the wheel supporting means which are accompanied by relative axial movements between the cylinder body and the main piston resulting in hydraulic fluid pressure and volume variations in the cylinder chamber 12. In this condition, the hydraulic fluid volume in the cylinder chamber 12 fluctuates and the hydropneumatic spring 34 absorbs or desorbs the fluctuating amount of the hydraulic fluid through the passage 44 into and out of the fluid chamber 42 with the result that the gas in the chamber 40 is compressed or expanded to compensate for the volume variations of the hydraulic fluid in the cylinder chamber 12. Under these circumstances, the first and second floating pistons 52 and 80 are maintained substantially stationary relative to the cylinder head 14 because of the opposing forces acting on the first and second floating pistons 52 and 80 being equal and because of the fluid passage 90 formed in the second floating piston 80 and the fluid passage 21 formed in the cylinder head 14 adjust the volumes in the chambers formed in the bores 72 and 20. Since, in this condition, the first and second floating pistons 52 and 80 remain in the neutral position as shown in FIG. 1, the inlet and outlet valves 60 and 88 are closed.

If the load of the vehicle is increased, the hydropneumatic suspension unit is compressed with the cylinder body 10 moved downwardly, viz., toward the axle carrying the mounting eye 28. This causes the push rod 94 to move the first and second floating pistons 52 and 80 upwardly of the drawing, viz., toward the first vehicle level adjusting position against the opposing force of the compression spring 66. It should be appreciated that during upward movement of the first floating piston 52, the hydraulic fluid in the axial bore 20 formed in the cylinder head 14 is admitted through the flow restriction 21a and the fluid passage 21 into the cylinder chamber 12 whereby the first floating piston 52 is moved toward the first vehicle level adjusting position gradually due to the restricting action of the flow restriction 21a. As the first floating piston 52 is moved upwardly, the circumferential edge 62 of the first floating piston 52 disengages the valve seat 64 formed in the cylinder head 14. The inlet valve 60 is thus opened and, consequently, hydraulic fluid under pressure from a hydraulic fluid source is admitted through the inlet passage 58 into the cylinder chamber 12. Hydraulic fluid under pressure thus admitted to the cylinder chamber 12 then acts on the main portion 22 thereby extending the hydropneumatic suspension unit. The cylinder body 10 is in this manner moved upwardly away from the axle until the first and second floating pistons 52 and 80 return to the neutral position shown in FIG. 1.

Figure 2:
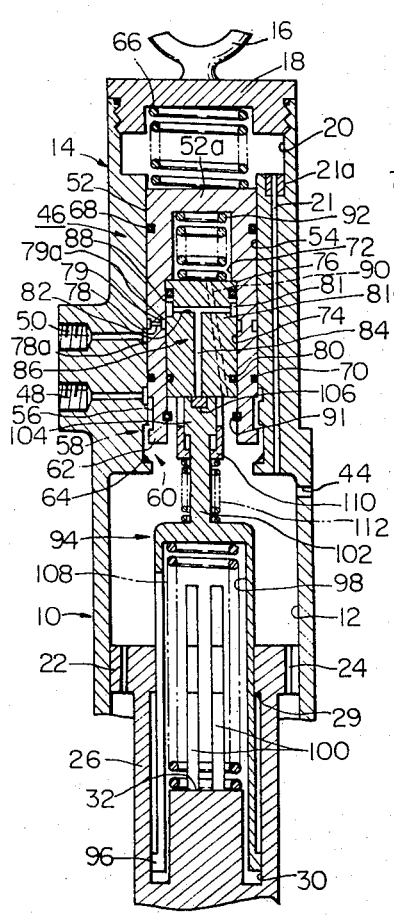
FIG. 2 is a view illustrating one mode of operation of the hydropneumatic suspension unit shown in FIG. 1.

It should be borne in mind that when the first and second floating pistons 52 and 80 assume the positions shown in FIG. 2, the outlet passage 86 is closed by the sealing member 106 mounted on the head portion 104 of the axial extension 102 and the outlet valve 88 is closed because of engagement of the circumferential edge of the second floating piston 80 and the circumferential edge formed in the first floating piston 52 whereby the hydraulic fluid in the cylinder chamber 12 is prevented from entering the hydraulic fluid outlet 50 and, therefore, reduction of the effective length of the hydropneumatic suspension unit is completely prevented.

It should also be understood that when the cylinder body 10 moves downwardly due to load increase of the vehicle, the sleeve 110 of the shock absorber engages the lower surface of the second floating piston 80 before the head portion 104 of the push rod 102 engages therewith thereby absorbing shocks exerted on the second floating piston 80.

Figure 3:
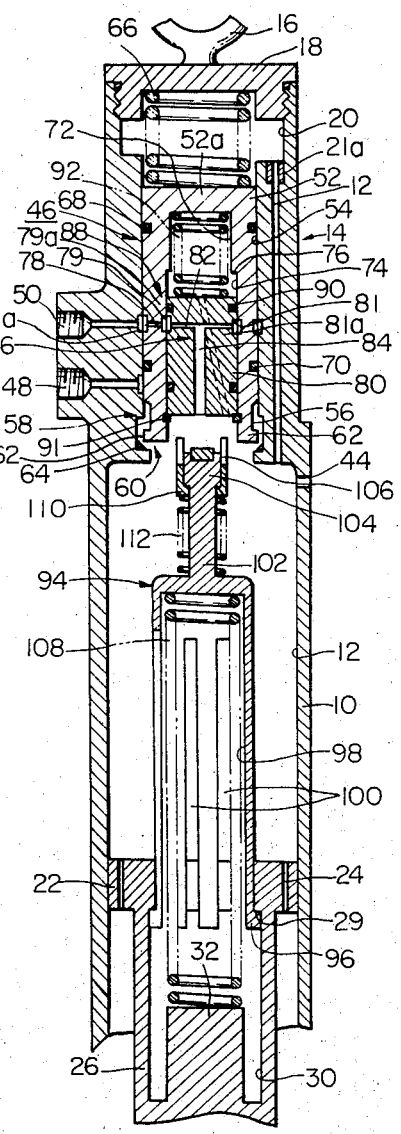
FIG. 3 is a view similar to FIG. 2 but shows another mode of operation of the hydropneumatic suspension unit shown in FIG. 1.

If, on the contrary, the load of the vehicle is decreased, the cylinder body 10 moves upwardly away from the axle (not shown) because of the low hydraulic fluid pressure in the cylinder chamber 12. and the spring unit 34. As the cylinder body 10 moves upwardly a certain distance, the force of the compression spring 66 overcomes the opposite force of the vehicle level detecting spring 108 thereby moving the first floating piston 52 toward the neutral position until the circumferential edge 62 of the first floating piston 52 engages the valve seat 64. The inlet valve 60 is thus closed so that hydraulic fluid in the hydraulic fluid inlet 48 is prevented from being admitted to the cylinder chamber 12. As the cylinder body 10 moves further upwardly, the spring force of the vehicle level adjusting spring 92 is balanced with the opposing spring force of the vehicle level detecting spring 108. Thereafter, the head portion 104 of the push rod 94 initially disengages the lower surface of the second floating piston 80 to open the passage 84 of the outlet passage 86 and, subsequently, the sleeve 110 disengages the lower surface of the second floating piston 80. At the same time, the second floating piston 80 is moved downwardly, that is, toward the second vehicle level adjusting position by the action of the vehicle level adjusting spring 92 until the lower surface of the second floating piston 80 engages the limit ring 91 mounted on the wall of the axial bore 74. In this condition, the annular recess 79 formed in the axial bore 74 of the first floating piston 52 is aligned with the annular recess 81 formed on the outer periphery of the second floating piston 80 and the annular recess 78a formed in the bore 54, and, thus, the outlet valve 88 is opened to provide fluid communication between the hydraulic fluid outlet 50 and the cylinder chamber 12 through the outlet passage 86 as shown in FIG. 3. Under this circumstance, hydraulic fluid under pressure in the cylinder chamber 12 is allowed into the hydraulic fluid outlet 50, through which excess hydraulic fluid is drained off. The cylinder body 10 is thus permitted to move downwardly until the second floating piston 80 is moved to the neutral position as shown in FIG. 1 by the action of the push rod 94 while, at the same time, the first floating piston 52 is kept in the neutral position.

Thus, the effective length of the hydropneumatic suspension unit is returned to its initial predetermined value and, thereafter, the vehicle level is maintained substantially constant.

Another preferred embodiment of the hydropneumatic suspension unit according to the present invention is illustrated in FIG. 4, in which like or corresponding component parts are designated by the same reference numerals are used in FIGS. 1, 2 and 3 except that, where a slight modification is present, the reference numeral has a prime (') added thereto. In the illustrated embodiment of FIG. 4, the flow restriction 21a provided in the fluid passage 21 is substituted by a one-way check valve 120 and the fluid passage 90 formed in the second floating piston 80 is provided with a one-way check valve 122.

As best seen in FIG. 5, each of the one-way check valves 120 and 122 comprises a valve member 124 having formed therein a small aperture or an orifice 124a to restrict the flow of hydraulic fluid passing therethrough one way, and a compression spring 126 for biasing the valve member 124 in a direction to close the fluid passage 21 or 90. The valve member 124 is movably disposed in a bore 128 formed in the cylinder head 14 or in the second floating piston 80. The valve member 124 is shown as an annular plate, the outer diameter of which is smaller than that of the bore 128 to provide sufficient spacing therebetween to pass hydraulic fluid therethrough without flow restriction when the valve member 124 opens the fluid passage 21 or 90.

With this arrangement, the first and second floating pistons 52 and 80 are quickly movable when they are moved in directions to close the inlet and outlet valves 60 and 88, whereas, when the first and second floating pistons 52 and 80 are moved in directions to open the inlet and outlet valves 60 and 88, the first and second floating piston 52 and 80 are movable gradually due to the flow restrictions of the one-way check valves 120 and 122, respectively. This is advantageous in that, if the effective length of the hydropneumatic suspension unit returns to its predetermined level during operation of the vehicle level adjusting device 46, the first and second floating pistons 52 and 80 are moved to the neutral position within a short period of time without being hampered by the flow restricting actions of the one-way check valves 120 and 122 for closing the inlet and outlet valves 60 and 88 thereby to prevent excessive supply and drain of hydraulic fluid.

In the illustrated embodiment of FIG. 4, the hydropneumatic suspension unit is shown as further comprising a vehicle body level control or selection device 130 which is mounted between the push rod 94 and a piston rod projection 136 to change the effective length of the hydropneumatic suspension unit at will. The vehicle level control device 130 includes a vehicle level control cylinder 132 which is located in the axial bore 30' formed in the piston rod 26' of the main piston 22' and which is axially movable therein to vary the spring force of the vehicle level detecting spring 108. To this end, the upper surface of the vehicle level control cylinder 132 supports the lower end of the vehicle level detecting spring 108.

The vehicle body level control cylinder 132 has formed therein an axially extending blind bore 134, in which the axial projection 136 formed within the piston rod 26' is accommodated to form a fluid chamber 134a therebetween. The vehicle body level control cylinder 132 is slidable on the projection 136 of the piston rod 26'. Hydraulic fluid is supplied into or out of the fluid chamber 134a through a fluid passage 138 formed in the piston rod 26' and the projection 136 so that the position of the vehicle body level control cylinder 132 determines the force exercised by the vehicle level detecting spring 108. The fluid passage 138 is connected to a suitable source of hydraulic fluid under pressure, though not shown.

As shown, the vehicle body level control cylinder 132 is formed at its uppermost end with a radially extending annular projection or flange 140 having its outer periphery sliding within the cavity 98 of the push rod 94' slidably disposed in the axial bore 30' of the piston rod 26'. The annular flange 140 of the vehicle body level control or selection cylinder 132 serves as a stop to prevent excessive upward movement of the push rod 94' relative to the control cylinder 132 when it engages the annular projection 96' of the push rod 94'.

Indicated at 142 is a by-pass passage which is formed at an upper portion of the vehicle level control cylinder 132 so as to provide fluid communication between the cavity 98 of the push rod 94' and the axial bore 30' of the piston rod 26' for thereby effecting smooth movement of the push rod 94' within the axial bore 30'. The cavity or bore 98 of the push rod 94' is in fluid communication with the cylinder chamber 12 through an opening or openings 100' formed in the push rod 94'.

With the construction mentioned hereinabove, the hydropneumatic suspension unit shown in FIG. 4 functions to maintain the vehicle body level substantially constant irrespective of the weight and load of the vehicle and, in addition, provides selection of the vehicle level at will. The operation of the vehicle level adjusting device 46 is similar to that of the hydropneumatic suspension unit shown in FIGS. 1, 2 and 3 and, therefore, the detail description of the same is herein omitted for the sake of simplicity of description.

Figure 7:
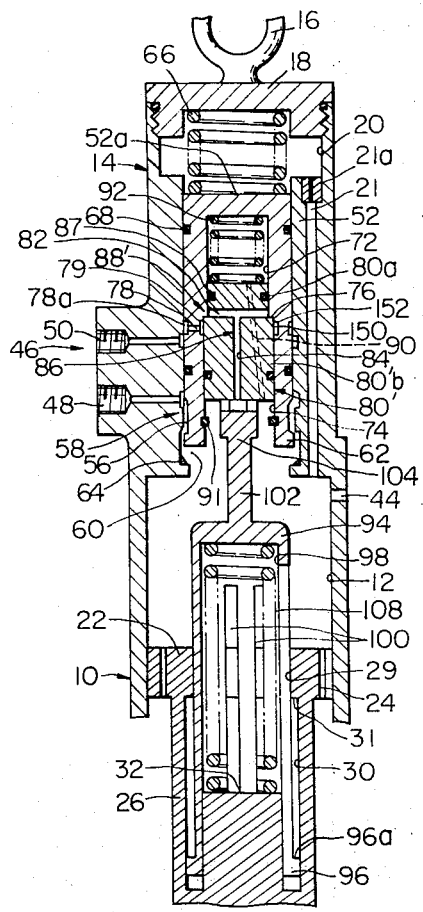
FIG. 7 is a view illustrating one mode of operation of the hydropneumatic suspension unit shown in FIG. 6.
Figure 8:
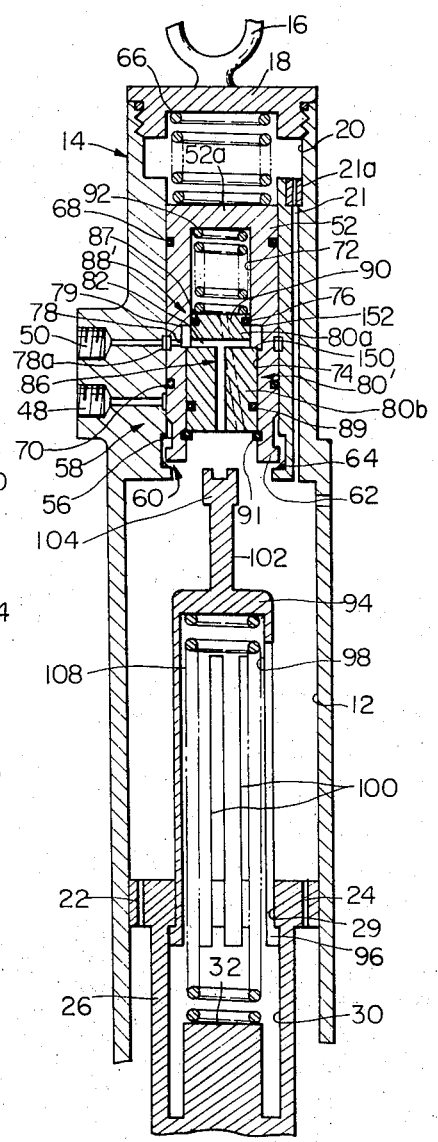
FIG. 8 is a view illustrating another mode of operation of the hydropneumatic suspension unit shown in FIG. 6.

Still another preferred embodiment of the hydropneumatic suspension unit according to the present invention is illustrated in FIGS. 6, 7 and 8, in which like or corresponding component parts are designated by the same reference numerals as used in FIGS. 1, 2 and 3 with the exception that, where a slight modification is present, the reference numeral has a prime (') added thereto. This embodiment differs from that of FIGS. 1, 2 and 3 in that the outlet valve 88 is modified and the sealing member 106 is dispensed with and in that the shock absorber comprising the sleeve 110 and the compression spring 112 is also dispensed with. Accordingly, the detail discussion of other component parts are herein omitted. In the illustrated embodiment of FIGS. 6, 7 and 8, the second floating piston, indicated at 80', is divided into upper and lower portions 80'a and 80'b which are slidably received in the axial bores 72 and 74, respectively, of the first floating piston 52. The lower portion 80'b of the second floating piston 80' has a circumferential edge 150 formed thereon, which forms a part of the outlet valve 88'. Another part of the outlet valve 88' is formed of a valve seat 152 formed in the first floating piston 52 at the annular shoulder 76 between the axial bores 72 and 74.

With the construction described hereinabove, if the effective length of the hydropneumatic suspension unit is at a predetermined value, the first and second floating pistons 52 and 80' are kept in the neutral position as shown in FIG. 6. In this condition, the inlet and outlet valves 60 and 88' are kept closed. Under these circumstances, the volume of hydraulic fluid in the cylinder chamber 12 remains unchanged and, thus, the effective length of the hydropneumatic suspenson unit is maintained at the substantially constant level.

If, however, the load of the vehicle is increased, the first and second floating pistons 52 and 80' are moved to the first vehicle level adjusting position by the action of the push rod 94 in a previously mentioned manner. In this instance, the inlet valve 60 is opened whereas the outlet valve 88' is closed as shown in FIG. 7 because he circumferential edge 150 of the second floating piston 80' is caused to engage the valve seat 152 formed in the first floating piston 52 by the action of the push rod 94. Consequently, hydraulic fluid is admitted from the source through the inlet 48 and the inlet passage 58 to the cylinder chamber 12 and acts on the main piston 22 thereby extending the hydropneumatic suspension unit. Thus, the effective length of the hydropneumatic suspension unit is returned to its predetermined level, where the first and second floating pistons 52 and 80' are maintained in the neutral position as shown in FIG. 6.

If, in contrast, the load of the vehicle is decreased, the push rod 94 disengages from the lower surface of the second floating piston 80' for the reason already mentioned hereinabove in connection with the first embodiment. Accordingly, the first floating piston 52 is moved to the position to close the inlet valve 60 by the action of the compression spring 66, while the second floating piston 80' is moved downwardly by the action of the vehicle level adjusting spring 92 until the lower surface of the second floating piston 80' abuts against the limit ring 91. In this condition, the circumferential edge 150 of the second floating piston 80' disengages the valve seat 152 formed in the first floating piston 52 and, thus, the outlet valve 88' is opened. Hydraulic fluid in the cylinder chamber 12 is thus permitted to flow through the outlet passage 86 into the hydraulic fluid outlet 50, through which excessive hydraulic fluid is drained off. Thus, the effective length of the hydropneumatic suspension unit is reduced until it reaches the initial predetermined level, where the first and second floating pistons 52 and 80' assume the position shown in FIG. 6.

Still another preferred embodiment of the hydropneumatic suspension unit according to the present invention is illustrated in FIGS. 9 and 10, in which like or corresponding component parts are designated by the same reference numerals are used in FIGS. 6, 7 and 8 with the exception that, where a slight modification is present, the reference numeral has a double prime ('') added thereto. In the illustrated embodiment of FIGS. 9 and 10, the flow restriction 21a provided in the fluid passage 21 is substituted by a one-way check valve 160 and the fluid passage 90 formed in the second floating piston 80' is provided with a one-way check valve 162.

As best seen in FIG. 10, each of the one-way check valves 160 and 162 comprises a valve member 164 having formed therein a small aperture or an orifice 164a to restrict the flow of hydraulic fluid passing therethrough one way, and a compression spring 166 for biasing the valve member 164 in a direction to close the fluid passage 21 or 90. The vlave member 164 is movably disposed in a bore 168 formed in the cylinder head 14 or in the second floating piston 80'. The valve member 164 is shown as being an annular plate, the outer diameter of which is smaller than that of the bore 168 to provide sufficient spacing therebetween to pass hydraulic fluid therethrough without flow restriction when the valve member 164 opens the fluid passage 21 or 90.

With this arrangement, the first and second floating pistons 52 and 80' are quickly movable when they are moved in directions to close the inlet and outlet valves 60 and 88', whereas, when the first and second floating pistons 52 and 80' are moved in directions to open the inlet and outlet valves 60 and 88', the first and second floating pistons 52 and 80' are movable gradually due to the flow restricting actions of the one-way check valves 160 and 162, respectively. This is advantageous in that, if the effective length of the hydropneumatic suspension unit returns to its predetermined level during operation of the vehicle level adjusting device 46, the first and second floating pistons 52 and 80' are moved to the neutral position within a short period of time without being hampered by the flow restricting actions of the one-way check valves 160 and 162 whereby the inlet and outlet valves 60 and 88' are closed for thereby preventing excessive supply or drain of hydraulic fluid.

In the illustrated embodiment of FIGS. 9 and 10, the hydropneumatic suspension unit further comprises a vehicle body level control or selection device 170 which is capable of selecting the effective length of the hydropneumatic suspension unit at will. The vehicle level control device 170 includes a vehicle level control or selection cylinder 172 which is located in the axial bore 30'' formed in the piston rod 26'' of the main piston 22'' and which is axially movable therein to vary the spring force of the vehicle body level detecting spring 108. To this end, the upper surface of the vehicle body level control cylinder 172 supports the lower end of the vehicle body level detecting spring 108.

The vehicle body level control cylinder 172 has formed therein an axially extending blind bore 174, in which an axial projection 176 formed in the piston rod 26'' is accommodated to form a fluid chamber 174a therebetween. The control cylinder 172 is slidable on the projection 176. Hydraulic fluid is passed into or out of the fluid chamber 174a through a fluid passage 178 formed in the piston rod 26'' and the projection 176 so that the position of the vehicle b body level control or selection cylinder 172 determines the force exercised by the vehicle level detecting spring 108. The fluid passage 178 is hydraulically connected to a suitable source (not shown) of fluid under pressure.

As shown, the vehicle body level control or selection cylinder 172 is formed at its uppermost end wit a radially extending annular porjection or flange 180 having its outer periphery sliding within the cavity 98 of a push rod 94'' which is slidably disposed in an axial bore 30'' of the piston rod 26''. The annular flange 180 of the vehicle level control cylinder 172 serves as a stop to prevent excessive upward movement of the push rod 94'' relative to the control cylinder 172 when it engages the annular projection 96'' of the push rod 94''.

Indicated at 182 is a by-pass passage which is formed at an upper portion of the vehicle level control cylinder 172 so as to provide fluid communication between the cavity or bore 98 of the push rod 94'' and the axial bore 30'' of the piston rod 26'' for thereby effecting smooth movement of the push rod 94'' within the axial bore 30''. The cavity or bore 98 of the push rod 94'' is in fluid communication with the cylinder chamber 12 through an opening or openings 100'' formed in the push rod 94''.

With the construction mentioned hereinabove, the hydropneumatic suspension unit of FIG. 9 functions to maintain the vehicle body level substantially constant irrespective of the weight and load of the vehicle and to change the vehicle body level at will.

It should now be understood from the foregoing description that the hydropneumatic suspension unit embodying the present invention is capable of minimizing the leakage of hydraulic fluid from the cylinder chamber by employing novel and simple inlet and outlet valves.

It should also be noted that the hydropneumatic suspension unit of the present invention has a novel vehicle level adjusting device which is adapted to completely avoid leakage of hydraulic fluid.

What is claimed is:

1. A hydropneumatic suspension unit for a road vehicle and adapted to adjust the vehicle body to a substantially constant selectable level irrespective of weight and load of the vehicle, comprising a cylinder body having a cylinder head formed with an axially extending bore therein and having a cylinder chamber filled with hydraulic fluid water pressure, a main piston slidably accommodated in said cylinder chamber and having a piston rod axially extending outwardly of said cylinder chamber, a first floating piston slidably accommodated in said axially extending bore of said cylinder head, said first floating piston having an axially extending bore formed therein, a second floating piston slidably accommodated in the axially extending bore of said first floating piston, a hydraulic fluid inlet formed in said cylinder head, a hydraulic fluid outlet formed in said cylinder head, inlet passage means formed between the wall of the axially extending bore of said cylinder head and an annular recess formed on an outer periphery of said first floating piston and communicable with said hydraulic fluid inlet and said cylinder chamber, outlet passage means formed in said first and second floating pistons and communicable with said hydraulic fluid outlet and said cylinder chamber, inlet valve means provided in said inlet passage means for controlling fluid communication between said hydraulic fluid inlet and said cylinder chamber, outlet valve means provided in said outlet passage means for controlling fluid communication between said hydraulic fluid outlet and said cylinder chamber, first biasing means for biasing said first floating piston in one direction, second biasing means for biasing said second floating piston in said one direction and third biasing means for biasing said second floating piston and said first floating piston through said second biasing means, in an opposite direction, said inlet means being opened to provide fluid communication between said hydraulic fluid inlet and said cylinder chamber while said outlet valve means is closed when said first and second floating pistons are moved in said opposite direction by the actions of said second and third biasing means, said outlet valve means being opened to provide fluid communication between said hydraulic fluid outlet and said cylinder chamber while said inlet valve means is closed when said first floating piston is moved by said first biasing means in said one direction to close said inlet valve means and said second floating piston is moved by the action of said second biasing means in said one direction to open said outlet valve means; and said inlet and outlet valve means being concurrently closed to interrupt fluid communications between said hydraulic fluid inlet and said cylinder chamber and between said hydraulic fluid outlet and said cylinder chamber when said first and second floating pistons are moved to a neutral position in which the sum of biasing forces of said first and second biasing means balances with the opposing force of said third biasing means.

2. A hydropneumatic suspension unit according to claim 1, in which said outlet passage means is formed of an axially extending passageway, a radially extending passageway connected to said axially extending passageway and communicating with an annular recess, all formed in said second floating piston; another radially extending passageway formed in said first floating piston; and said hydraulic fluid outlet communicating with an annular recess formed in said bore of said cylinder head.

3. A hydropneumatic suspension unit according to claim 1, in which said inlet valve means is formed of a valve seat formed in said cylinder head and a circumferential edge formed on the outer periphery of said first floating piston.

4. A hydropneumatic suspension unit according to claim 1, in which said outlet valve means is formed of a circumferential edge formed in said first floating piston and a circumferential edge formed on an outer periphery of said second floating piston.

5. A hydropneumatic sudpension unit for a road vehicle and adapted to djust the vehicle body to a substantially constant level irrespective of weight and load of the vehicle, comprising a cylinder body having a cylinder head formed with an axially extending bore therein and having a cylinder chamber filled with hydraulic fluid under pressure, a main piston slidably accommodated in said cylinder chamber and having a piston rod axially extending outwardly of said cylinder chamber, a first floating piston slidably accommodated in the axially extending bore of said cylinder head, said first floating piston having an axially extending bore formed threin, a second floating piston slidably accommodated in the axially extending bore of said first floating piston, a hydraulic fluid inlet formed in said cylinder head, a hydraulic fluid outlet formed in said cylinder head, inlet passage means formed between the wall of the axially extending bore of said cylinder head and an annular recess formed on an outer periphery of said first floating piston and communicable with said hydraulic fluid inlet and said cylinder chamber, outlet passage means formed in said first and second floating pistons and communicable with said hydraulic fluid outlet and said cylinder chamber, inlet valve means provided in said inlet passage means for controlling fluid communication between said hydraulic fluid inlet and said cylinder chamber, outlet valve means provided in said outlet passage means for controlling fluid communication between said hydraulic fluid outlet and said cylinder chamber, first biasing means disposed in the axially extending bore of said cylinder head for biasing said first floating piston in one direction, second biasing means disposed in the axially extending bore of said first floating piston for biasing said second floating piston in said one direction, and third biasing means disposed in said cylinder chamber for biasing said second floating piston and said first floating piston through said second biasing means in an opposite direction, said third biasing means including a push rod slidably received in an axial bore formed in said main piston and said piston rod and a compression spring disposed between said push rod and said main piston, said push rod having at its are extreme end facing said second floating piston a head portion selectively engageable with said second floating piston to bias said second floating piston and said first floating piston through said second biasing means in said opposite direction by the action of said compression spring, said inlet valve means being opened to provide fluid communication between said hydraulic fluid inlet and said cylinder chamber while said outlet valve means is closed when said first and second floating pistons are moved in said opposite direction by the action of said third biasing means, said outlet valve means being opened to provide fluid communication between said hydraulic fluid outlet and said cylinder chamber while said inlet valve means is closed when said first floating piston is moved by said first biasing means in said one direction to close said inlet valve means and said second floating piston is moved by the action of said second biasing means in said one direction to open said outlet valve means; and said inlet and outlet valves being concurrently closed to interrupt fluid communications between said hydraulic fluid inlet and said cylinder chamber and between said hydraulic fluid outlet and said cylinder chamber when said first and second floating pistons are moved to a neutral position in which the sum of biasing forces of said first and second biasing means balances with the opposing force of said third biasing means.

6. A hydropneumatic suspension unit according to claim 5, in which said outlet passage means if formed of an axially extending passageway, a radially extending passageway connected to said axially extending passageway and communicating with an annular recess, all formed in said second floating piston; another radially extending passageway formed in said first floating piston; and said hydraulic fluid outlet communicating with an annular recess formed in said bore of said cylinder head.

7. A hydropneumatic suspension unit according to claim 6, in which said inlet valve means is formed of a valve seat formed in said cylinder head and a circumferential edge formed on the outer periphery of said first floating piston.

8. A hydropneumatic suspension unit according to claim 7, in which said outlet valve means is formed of a circumferential edge formed in said first floating piston and a circumferential edge formed in the outer periphery of said second floating piston.

9. A hydropneumatic suspension unit according to claim 8, further comprising a sealing member which is mounted on said head portion of said push rod to close tightly the axially extending passageway forming part of said outlet passage means when said head portion of said push rod engages said second floating piston.

10. A hydropneumatic suspension unit according to claim 9, further comprising first fluid passage means formed in said cylinder head to provide fluid communication between said cylinder chamber and a fluid chamber defined between an end wall of the axially extending bore of said cylinder head and surface of said first floating piston of said cylinder head of the axially extending bore facing said end wall, and second fluid passage means formed in said second floating piston to provide fluid communication between said cylinder chamber and a fluid chamber defined between an end wall of the axially extending bore of said first floating piston and a surface of said second floating piston facing said end wall of the axially extending bore of said first floating piston.

11. A hydropneumatic suspension unit according to claim 10, further comprising first and second one-way check valve means disposed in said first and second fluid passage means, respectively, said first one-way check valve means providing flow restricting action when said first floating piston is moved in said opposite direction, and said second one-way check valve means providing flow restricting action only when said second floating piston is moved in said one direction.

12. A hydropneumatic suspension unit according to claim 5, in which said push rod has an annular projection engageable with an annular shoulder formed in said bore of said main piston to prevent excessive movement of said push rod toward said cylinder head.

13. A hydropneumatic suspension unit according to claim 7, in which said outlet valve means is formed of a valve seat formed in said first floating piston and a circumferential edge formed on the outer periphery of said second floating piston.

14. A hydropneumatic suspension unit according to claim 13, further comprising first fluid passage means formed in said cylinder head to provide fluid communication between said cylinder chamber and a fluid chamber defined between an end wall of the axially extending bore of said cylinder head and a surface of said first floating piston facing the end wall of the axially extending bore of said cylinder head, and second fluid passage means formed in said second floating piston to provide fluid communication between said cylinder chamber and a fluid chamber defined between an end wall of the axially extending bore of said first floating piston and a surface of said second floating piston facing said end wall of the axially extending bore of said first floating piston.

15. A hydropneumatic suspension unit according to claim 14, further comprising first and second one-way check valve means disposed in said first and second fluid passage means, respectively, said first one-way check valve means providing flow restricting action when said first floating piston is moved in said another direction, and said second one-way check valve means providing flow restricting action only when said second floating piston is moved in said one direction.

16. A hydropneumatic suspension unit according to claim 15, in which said push rod has an annular projection engageable with an annular shoulder formed in said bore of said main piston to prevent excessive upward movement of said push rod.

17. A hydropneumatic suspension unit for a road vehicle and adapted to adjust the vehicle body to a substantially constant selectable level irrespective of weight and load of the vehicle, comprising a cylinder body having a cylinder head formed with an axially extending bore therein and having a cylinder chamber filled with hydraulic fluid under pressure, a main piston slidably accommodated in said cylinder chamber and having a piston rod axially extending outwardly of said cylinder chamber, a first floating piston slidably accommodated in the axially extending bore of said cylinder head, said first floating piston having an axially extending bore formed therein, a second floating piston slidably accommodated in the axially extending bore of said first floating piston, a hydraulic fluid inlet formed in said cylinder head, a hydraulic fluid outlet formed in said cylinder head, inlet passage means formed between the wall of the axially extending bore of said cylinder head and an annular recess formed on an outer periphery of said first floating piston and communicable with said hydraulic fluid inlet and said cylinder chamber, outlet passage means formed in said first and second floating pistons and communicable with said hydraulic fluid outlet and said cylinder chamber, inlet valve means provided in said inlet passage means for controlling fluid communication between said hydraulic fluid inlet and said cylinder chamber, outlet valve means provided in said outlet passageway means for controlling fluid communication between said hydraulic fluid outlet and said cylinder chamber, first biasing means disposed in the axially extending bore of said cylinder head for biasing said first floating piston in one direction, second biasing means disposed in the axially extending bore of said first floating piston for biasing said second floating piston in said one direction, third biasing means disposed in said cylinder chamber for biasing said second floating piston and said first floating piston through said second biasing means in an opposite direction, said third biasing means including a push rod slidably received in an axial bore formed in said main piston and said piston rod and a compression spring disposed in a cavity formed in said push rod, said push rod having at its are end facing said second floating piston a head portion engageable with said second floating piston to bias said second floating piston and said first floating piston through said second biasing means in said opposite direction by the action of said compression spring, and a vehicle body level selection device mounted between said push rod and said main piston and having a vehicle level selection cylinder located in the axial bore formed in said main piston and said piston rod, said vehicle levelselection cylinder being slidably disposed in said cavity of said push rod and axially movable in the axial bore formed in said main piston and said piston rod to vary the force said compression spring of said third biasing means exercises on said second floating piston through said push rod, said inlet valve means being opened to provide fluid communication between said hydraulic fluid inlet and said cylinder chamber while said outlet valve means is closed when said first and second floating pistons are moved in said opposite direction by the action of said third biasing means, said outlet valve means being opened to provide fluid communication between said hydraulic fluid outlet and said cylinder chamber while said inlet valve means is closed when said first floating piston is moved by said first biasing means in said one direction to close said inlet valve means and said second floating piston is moved by the action of said second biasing means in said one direction to open said outlet valve means; and said inlet and outlet valve means being concurrently closed to interrupt fluid communications between said hydraulic fluid inlet and said cylinder chamber and between said hydraulic fluid outlet and said cylinder chamber when said first and second floating pistons are moved to a neutral position in which the sum of biasing forces of said first and second biasing means balances with the opposing force of said third biasing means.

18. A hydropneumatic suspension unit according to claim 17, in which said outlet passage means is formed of an axially extending passageway, a radially extending passageway connected to said axially extending passageway and communicating with an annular recess, all formed in said second floating piston; another radially extending passageway formed in said first floating piston; and said hydraulic fluid outlet communicating with an annular recess formed in said bore of said cylinder head.

19. A hydropneumatic suspension unit according to claim 18, in which said inlet valve means is formed of a valve seat formed in said cylinder head and a circumferential edge formed on the outer periphery of said first floating piston.

20. A hydropneumatic suspension unit according to claim 19, in which said outlet valve means is formed of a circumferential edge formed in said first floating piston and a circumferential edge formed on the outer periphery of said second floating piston.

21. A hydropneumatic suspension unit according to claim 20, further comprising a sealing member which is mounted on said head portion of said push rod to close the axially extending passagewyay of said outlet passage means when said head portion of said push rod engages said second floating piston.

22. A hydropneumatic suspension unit according to claim 21, further comprising first fluid passage means formed in said cylinder head to provide fluid communication between said cylinder chamber and a fluid chamber defined between an end wall of the axially extending bore of said cylinder head and an upper surface of said first floating piston, and second fluid passage means formed in said second floating piston to provide fluid communication between said cylinder chamber and a fluid chamber defined between an end wall of the axially extending bore of said first floating piston and an upper surface of said second floating piston.

23. A hydropneumatic suspension unit according to claim 22, further comprising first and second one-way check valve means disposed in said first and second fluid passage means, respectively, said first one-way check valve means providing flow restricting action when said first floating piston is moved in said opposite direction, and said second one-way check valve means providing flow restricting action only when said second floating piston is moved in said one direction.

24. A hydropneumatic suspension unit according to claim 19, in which said outlet valve means is formed of a valve seat formed in said first floating piston and a circumferential edge formed on the outer periphery of said second floating piston.

25. A hydropneumatic suspension unit according to claim 24, further comprising first fluid passage means formed in said cylinder head to provide fluid communication between said cylinder chamber and a fluid chamber defined between an end wall of the axially extending bore of said cylinder head and an upper surface of said first floating piston, and second fluid passage means formed in said second floating piston to provide fluid communication between said cylinder chamber and a fluid chamber defined between an end wall of the axially extending bore of said first floating piston and an upper surface of said second floating piston.

26. A hydropneumatic suspension unit according to claim 25, further comprising first and second one-way check valve means disposed in said first and second fluid passage means, respectively, said first one-way check valve means providing flow restricting action when said first floating piston is moved in said oppostie direction, and said second one-way check valve means providing flow restricting action only when said second floating piston is moved in said one direction.

* * * * *